United States Patent [19]

Touchais et al.

[11] Patent Number: 4,496,787
[45] Date of Patent: Jan. 29, 1985

[54] METHOD AND DEVICE FOR COLLECTING AND EXPLOITING SOLAR RADIATION

[76] Inventors: Maurice Touchais, 1706 Chemin du Pioulier, 06140 Vence; Madeleine Djelalian, 10 Impasse Abovian, 13015 Marseille, both of France

[21] Appl. No.: 536,158
[22] PCT Filed: Dec. 16, 1982
[86] PCT No.: PCT/FR82/00212
§ 371 Date: Aug. 16, 1983
§ 102(e) Date: Aug. 16, 1983
[87] PCT Pub. No.: WO83/02310
PCT Pub. Date: Jul. 7, 1983

[30] Foreign Application Priority Data

Dec. 23, 1981 [FR] France ............... 81 24103

[51] Int. Cl.$^3$ .................. H01L 31/04; F24J 3/02
[52] U.S. Cl. .................. 136/248; 136/246; 126/424; 126/438; 126/440; 350/258; 350/264
[58] Field of Search ............ 136/246, 248, 259; 126/424, 438, 440; 350/258, 264

[56] References Cited

U.S. PATENT DOCUMENTS

| 3,085,565 | 4/1963 | Macauley | 126/451 |
| 3,203,167 | 8/1965 | Green, Jr. | 126/440 |
| 3,899,672 | 8/1975 | Levi-Setti | 350/293 |
| 4,088,121 | 5/1978 | Lapeyre | 126/424 |
| 4,289,112 | 9/1981 | Roseen | 126/415 |
| 4,427,838 | 1/1984 | Goldman | 136/248 |

FOREIGN PATENT DOCUMENTS

| 374525 | 4/1923 | Fed. Rep. of Germany | 126/438 |
| 2458768 | 2/1981 | France | 126/440 |

OTHER PUBLICATIONS

M. A. Duguay, "Solar Electricity: The Hybrid System Approach", American Scientist, vol. 65, pp. 422–427, (1977).

Primary Examiner—Aaron Weisstuch
Attorney, Agent, or Firm—Karl W. Flocks; Sheridan Neimark; A. Fred Starobin

[57] ABSTRACT

The method and apparatus of the invention are intended to collect, in the intermediary space comprised between the transparent cover and the absorbing receiver surfaces of a solar insolator, the substantially parallel light beams from the sun by thermally insulated and orientable optical means for tracking said beams, to make said beams converge at a so-called 'focal point', to recover through an opening having a diameter as small as possible the bundle of beams from such focal point and to make the bundle of beams penetrate the thermally insulated fixed housing, to use the latter as a thermal focus containing exchange surfaces, to create a vacuum in the housing for letting air or another gas in, to receive the solar radiation which has not been previously collected on absorbing receiver surfaces while circulating air or another gas in said intermediary space and to have at disposal all of the incident energy transferred both to said thermal focus and to the air or gas circulating the whole of said insolator.

19 Claims, 20 Drawing Figures

METHOD AND DEVICE FOR COLLECTING AND EXPLOITING SOLAR RADIATION

BACKGROUND OF THE INVENTION

It is known for using solar energy to employ fixed solar cells constituting thermal converters, also called "thermal function insolators" and hereinafter designated as "insolators". The latter generally comprise:

A transparent front covering through which solar radiation or incident light penetrates;

Absorbent receiving surfaces which convert the energy from the solar radiation into heat which is then transferred to heat transfer fluids, gases, or various liquids, in particular, air or water;

A rear thermal insulation covering.

The transparent covering which is mainly used for protection of the inside of the apparatus from bad weather is often designed and constructed so as to reduce thermal losses caused by transmission to the outside of the thermal flux generated in the apparatus, and also to oppose the passage of convective currents either from the inside of the apparatus or from the outside thereof.

Moreover, the interval also called "intermediate space" between such transparent covering and the absorbent receiving surfaces is generally of a small thickness so as to reduce the inner convective currents which may be responsible for significant thermal losses. This is why heretofore various devices were placed in such intermediate space for specifically combatting such convective currents and also the transmission of the infrared radiation coming from the heated surfaces, without however giving complete satisfaction as regards total utilization of incident energy

OBJECTS OF THE INVENTION

However, the purpose which is to be achieved by this invention is to be able to utilize to the maximum the overall solar radiation and consequently to maximize the incident energy while minimizing thermal losses.

The invention is therefore directed to a method for reaching said purpose, and devices for carrying out such method.

An object of the invention is also an insolator using such method and such devices as well as an installation comprising several insolators according to the invention with a view to having an all-purpose thermal source available.

SUMMARY OF THE INVENTION

The method according to the invention is substantially characterized in that it consists, within the intermediate space included between the transparent covering and the absorbent receiving surfaces of an insolator, of collecting the almost parallel light radiations coming from the sun through a suitable optical means thermally insulated and orientatable so as to follow said light radiation, converging said radiation towards a point called the "focal point" whereat they form a beam, gathering through an opening having as small a diameter as possible the beam of light radiation surrounding the focal point and making it penetrate into a generally stationary thermally insulated enclosure, using the latter as a thermal focus containing fixed exchange surfaces, bringing such enclosure to a negative pressure to cause air or another gas to penetrate thereinto, receiving the solar radiation not picked up previously onto absorbent receiving surfaces of a known type, while also circulating the air or other gas in said intermediate space and disposing of all the incident energy transferred both inside and outside said thermal focus to the various heat transfer fluids circulating in the whole of said insolator.

According to other characteristics:

Said opening of small diameter is located substantially at right angles to said focal point; and The concurring points of the actual or virtual rotational axes serving for the orientation motion of said optical means is placed at said focal point. For carrying out the method:

The optical means converging the direct, almost parallel, light radiation coming from the sun towards the focal point is selected among optical devices of the catoptric or dioptric type to permit the beam of reflected radiation to propagate in the general direction of the incident light;

According to one advantageous form of embodiment, said optical means comprises a Fresnel lens and/or reflective surfaces, the reflectance of which is high mainly in the visible range and low in the infrared spectrum, in association with a transparent covering located at the inlet of the solar radiation. In the case of a Fresnel lens, such covering is constituted by the lens itself;

More particularly, said optical means consists of a wide-angle paraboloid of revolution or a reflective surface formed of several wide-angle paraboloids of revolution located within one another and called a "multiparaboloid";

The thermally insulated enclosure designed for serving as the thermal focus is traversed by fixed pipes where heat transfer fluids circulate;

Said thermal focus is stationary relative to said optical means except for a portion which determines a junction between the movable elements connected to the optical means and the fixed elements;

Supplementary optical means called super-concentrators are provided close to the opening, situated at said focal point so as to embrace all the convergent possibly aberrant radiations to direct them efficiently to the focal opening so that they can penetrate into said thermal focus;

The walls of the thermal focus are made of a refractory material absorbing the received radiation;

Supplementary receiving absorbent alveolar surfaces are provided either at the outlet of the optical means, in the focal opening, or in said thermal focus, either at one or the other location to reduce losses due to retransmission through the focal opening;

The receiving absorbent surfaces outside the optical focusing means are advantageously constituted by tubular alveolae very absorbent in the visible and infrared ranges to form channels running in the direction of the light radiation by an air circulation brought into a turbulent motion.

According to an advantageous mode of embodiment, a safety shielding means is provided on the optical radiation path.

According to the invention there are also provided solar energy cells comprising, in the intermediate space between the transparent covering and the absorbing surfaces, one or more optical means such as defined above and called hereinafter "concentrators" disposed in one or more rows in one of the two directions in space, i.e. East-West or North-South.

BRIEF DESCRIPTION OF THE DRAWINGS

Other characteristics and advantages of this invention will more clearly appear from the following description which is made in reference to the attached drawings in which.

DETAILED DESCRIPTION OF THE DRAWINGS

Figure 1:
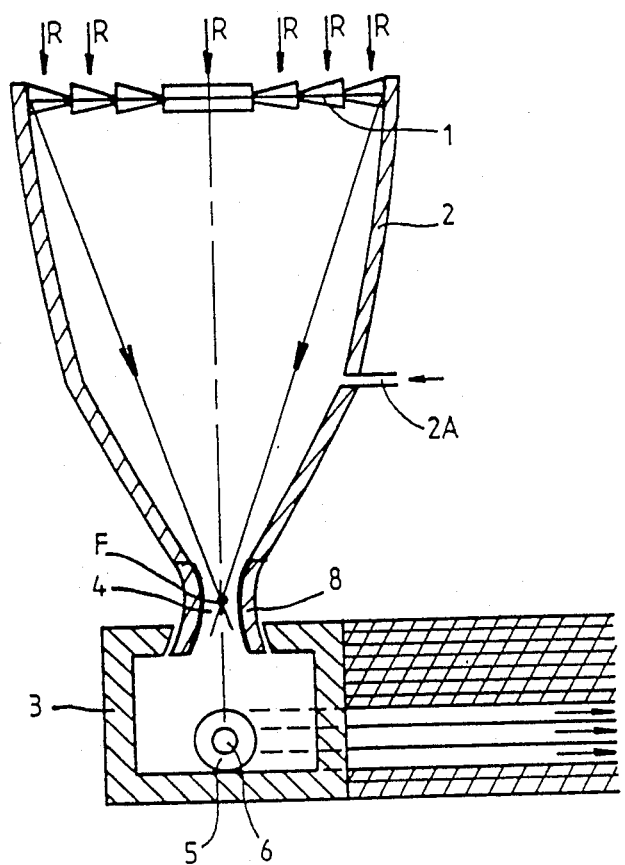
FIG. 1 is a schematic elevational view illustrating an optical (dioptric) means for carrying out the method according to the invention.
Figure 2:
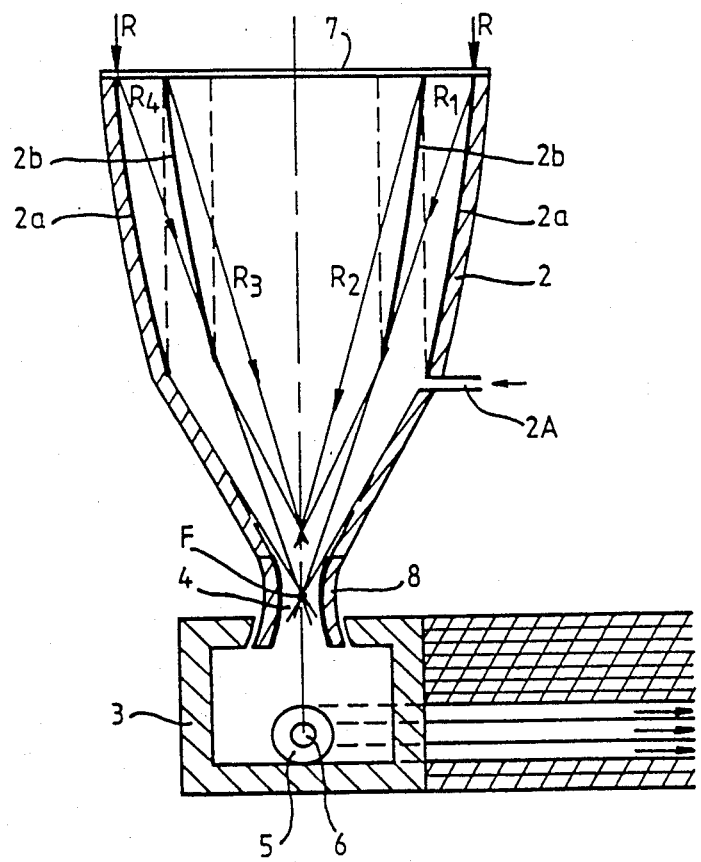
FIG. 2 is a modified embodiment of such optical (catoptric) means.

With reference to the drawings, FIGS. 1 and 2 show two modes of embodiment of an optical means for carrying out the invention.

In the case of FIG. 1, the device consists of a Fresnel lens 1 forming the inlet face of a thermally insulated enclosure 2 (called hereinafter "prefocus" containing the concentrator) made of an insulating refractory material which absorbs light radiation. This enclosure will advantageously have the form of a volume of revolution (such as a cone or any other volume of revolution).

A conduit 2A is provided for admitting air or any other suitable gas.

The incident parallel rays R coming from the sun after crossing the lens 1 converge at a point F called the "focal point". The so concentrated light then penetrates into a thermally insulated enclosure 3 called "thermal focus" through an opening 4 of crosssection as small as possible, precisely formed at right angles with said focal point F. Said enclosure is crossed by fixed pipes for circulation of heat transfer fluids (air-water) such as 5–6. The optical means and its accessories described above, required to be capable of following the sun in its apparent diurnal motion, is designed so as to be necessarily orientatable. To this end, the focal point F is located according to the invention in principle at the concurrent point of the rotational axes of the orientation motion of said with its concentrator. It will be noted that such orientation must be effected precisely (by means of devices not within the scope of this invention) for avoiding exaggerated increase in the dimensions of the opening 4 for penetration of light flux into the thermal focus 3, which would have the consequence of increasing energy losses through such opening (also called second window), the first window being the inlet opening for solar radiation in the concentrator itself, which is to be closed. Such closing is effected by the Fresnel lens 1. The dimensions of said first window are a priori arbitrary but they determine the dimensions of the whole of the cell and in particular of the framework containing and supporting all the pick up, conversion and thermal exchange elements as well as the accessories.

It will be easily understood that with the device just described the radiation energy is converted into heat in the "thermal focus" 3 and that it can also be transferred to the desired heat transfer fluid. According to the method of the invention the enclosure of said thermal focus is brought to a negative pressure so as to circulate air or any other gas admitted at 2A in the prefocus 2 and/or the remainder of the insolator (as will be seen hereinafter) and admit it in pipes such as at 5.

For safety purposes, there is also provided according to the invention among others a shielding device not shown) situated on the radiation path either upstream of the concentrator or at the outlet therefrom. The control system of such a device of a known type may use either optical or thermal waves or direct determination of the orientation error.

With reference to FIG. 2, the prefocus 2 closed by the transparent covering 7 comprises a wide-angled multiparaboloid of revolution or reflective surface formed from several paraboloids (such as $2a$–$2b$) internal relative to one another and explained in more detail hereinafter. The reflective parabola must necessarily be of a wide angle, i.e. using polar angles $\theta$ greater than 90° in order for the beam of reflected radiations (converging beam $R_1$, $R_2$, $R_3$, $R_4$) to continue to propagate in the general direction of the incident light R, the thermal focus being towards the ground and not in elevation as would be the case if the polar angle of the paraboloid reflector was less than 90°. The selected position towards the ground for the thermal focus makes it possible to fix all the pipes for circulating the fluid to be heated. Thus, due to this fact, the invention permits safer realization and exploitation of these pipes in which high temperatures and pressures may reign; consequently, their thermal insulation is also realizable more easily, hence it can be of better quality, which is a very significant aspect for attaining the purpose of this invention, since the temperature of the heat transfer fluid(s) necessarily results from a thermal balance, the loss element of which must be reduced to the minimum, such reduction of the losses being precisely obtained by means of this invention.

The wide-angled multiparaboloid reflector according to this invention is based on the following principle:

Let there be a generatrix of a wide-angle paraboloid mirror, it being limited by two diameters, the high and the low diameter. The light radiation directed so as to pass through the low diameter must be stopped by another reflective paraboloid with the same focal point. Such other paraboloid also raises the same problems and so on, which makes it necessary to consider several paraboloids internal to one another.

The light rays close to the axis come directly into the focal opening or at least into the optical device situated near the focal opening. FIGS. 5 to 8 give representations of several parabolic generatrices shown in full lines in a diametrical plane of the wide-angled multiparaboloid concentrator, in three hypotheses concerning the same diameter of the inlet window supposedly planar for the incident radiation and to the same maximum incidence angle of the reflective radiation for three heights, i.e. an arbitrary height (refer to FIG. 6), half of it (refer to FIG. 7) and a third of it (refer to FIG. 8). The focal point F is the adopted origin of the axes, i.e. axis of heights F - h, axis of the half-diameters F - d/2. The point $M_1$ of the most external paraboloid is therefore a datum as well as points $M_2, M_3, M_4, M_5, M_6$, and so on, which correspond to the other paraboloids internal to one another.

For example, $PM_1 = d_1/2$ is half the diameter of the most external paraboloid; $FP_1 = h_1$ is the height of such paraboloid the relative height of which is therefore:

$$h_1/d_1$$

The points $M'_1$ to $M'_6$ depending on the respective cases define the dimensions of the low diameters.

The maximum incidence angle $\theta'_1$ for the most external paraboloid has been arbitrarily selected here as equal to 40°. The reflected radiations are therefore included between angles $\theta'_1$ and $\theta_1$, the latter being given by the relation:

$$tg\ \theta_1 = \frac{\frac{d_1}{2}}{h_1} \quad (1)$$

The vector radius $FM_1 = P_1$ is given by the relation:

$$\rho_1 = \frac{h_1}{\cos \theta_1} \quad (2)$$

Figure 5:
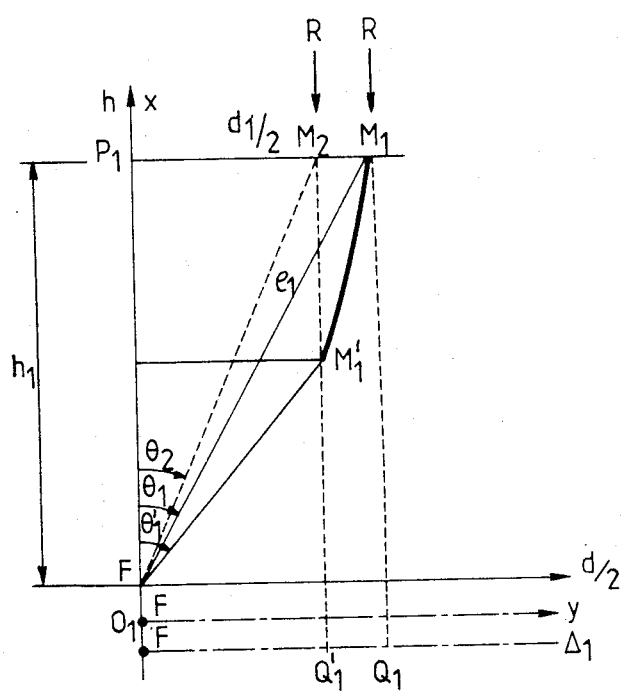
FIGS. 5 to 8 are views illustrating four possible parabolic generatrices used for realizing the optical means for carrying out the method of the invention.
Figure 6:
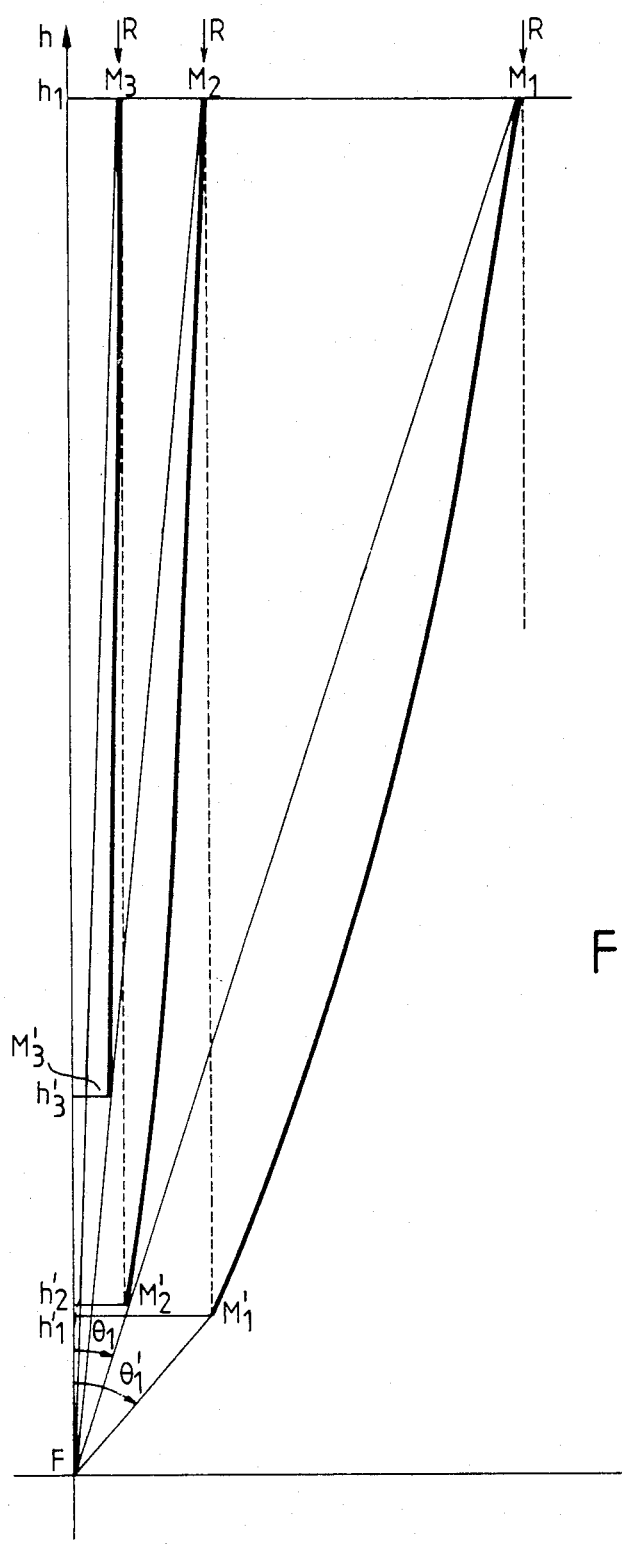
Figure 7:
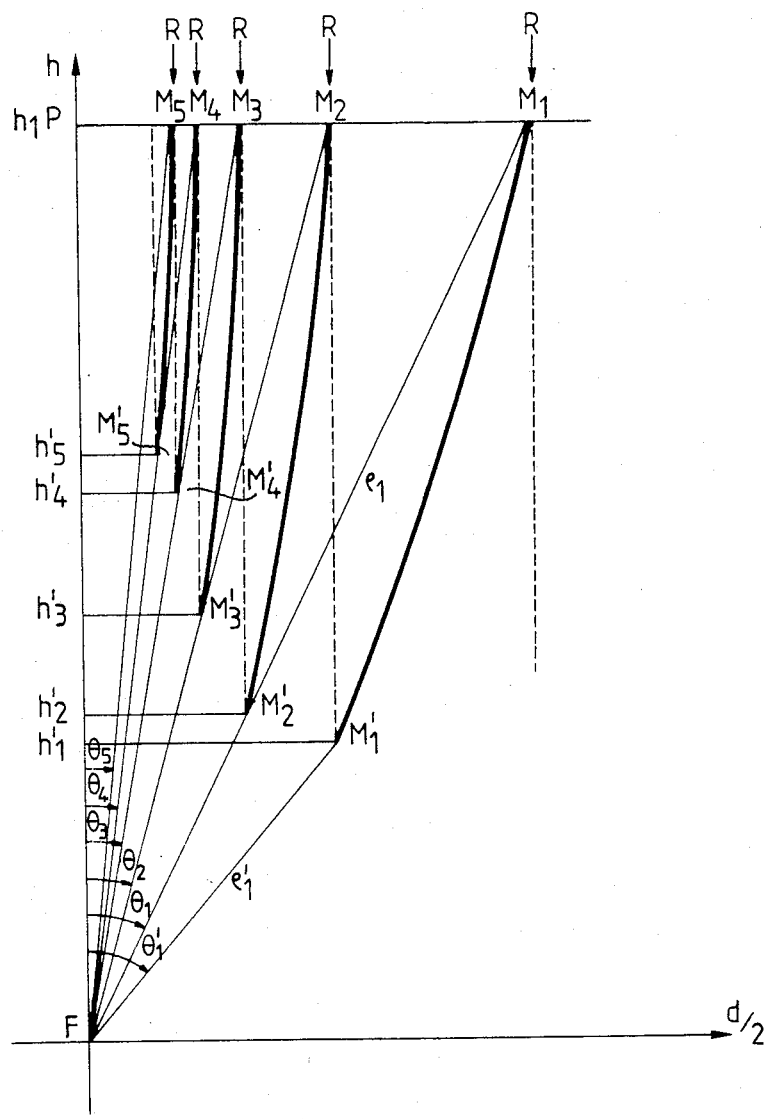
Figure 8:
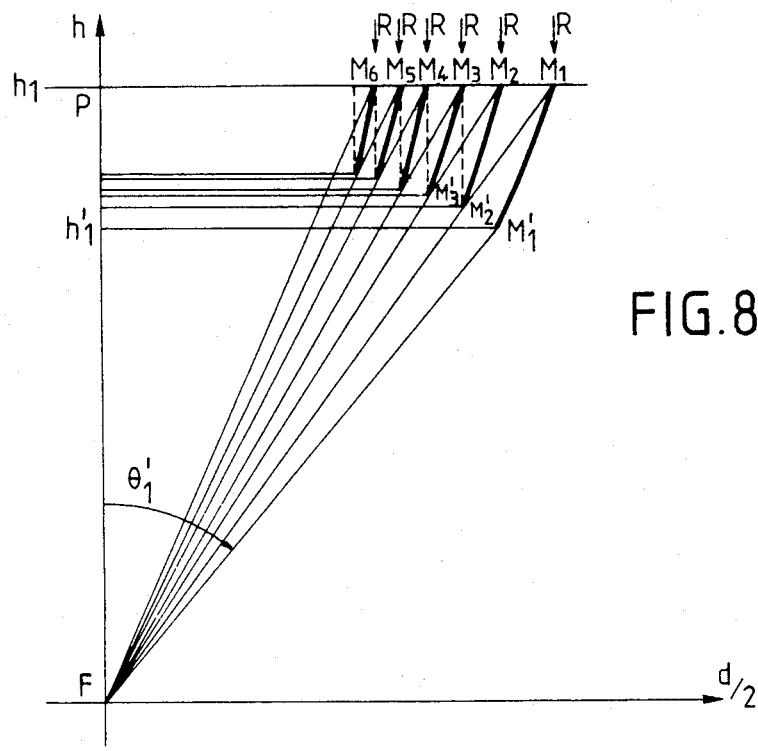

FIG. 5 which gives these various items also indicates the axes Oxy of the parabola and its directrix. There are:

$$FM_1 = \rho_1 \text{ and } M_1Q_1 = h_1 + 2f_1 \quad (3)$$

The focal distance of the parabola passing through $M_1$ is given by the relation:

$$f_1 = \frac{\rho_1 - h_1}{2} = h_1 \frac{1 - \cos \theta_1}{2 \cos \theta_1} \quad (4)$$

The knowledge of this focal distance permits plotting the parabola point by point.

When the number of paraboloids increases, the diameter of the first window decreases and the pick up surface decreases as the diameter squared.

In practical realization, one has to also take into account the thicknesses of the material forming the reflective surface and the divergence of the light radiations caused by the apparent diameter of the sun and the various errors of construction.

There are necessarily optical losses, a major part of which is converted into heat and is recovered in the prefocus, the fundamental roles of which are:

(1) of bringing into the thermal focus the energy lost by infrared emission; and (2) of suppressing convective losses.

It can be noted by plotting several parabolic generatrices that the number of reflectors is the larger the lower the relative height. Furthermore, it is also to be noted that the vector radius which finally determines the diameter of the focal opening is the greater the higher the relative height. An experimental compromise permits determination of the optimum conditions, which are to be commented on later on.

Another observation may also be made. As the parabolic generatrice come nearer to the axis, they tend to become rectilinear and such tendency is the stronger the lower the relative height and also the smaller the maximum incidence angle $\theta_1$.

Figure 11:
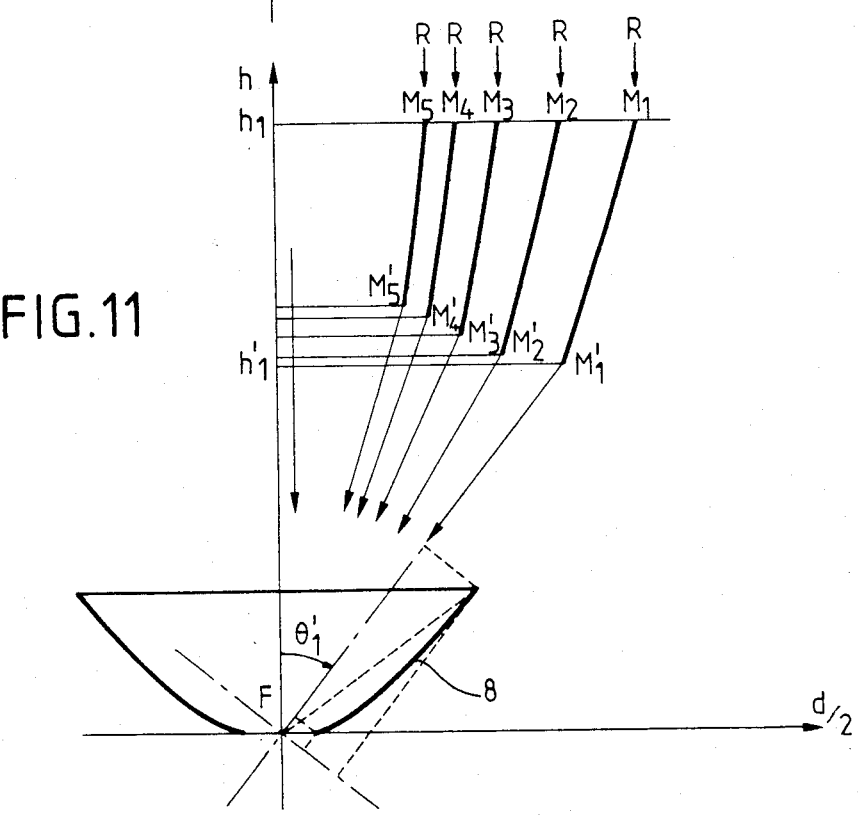
Figure 12:
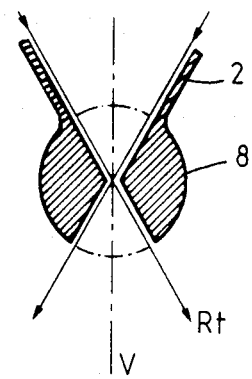
FIG. 12 is a schematic sectional view of such a super-concentrator adapted for a fixed thermal focus.
Figure 13:
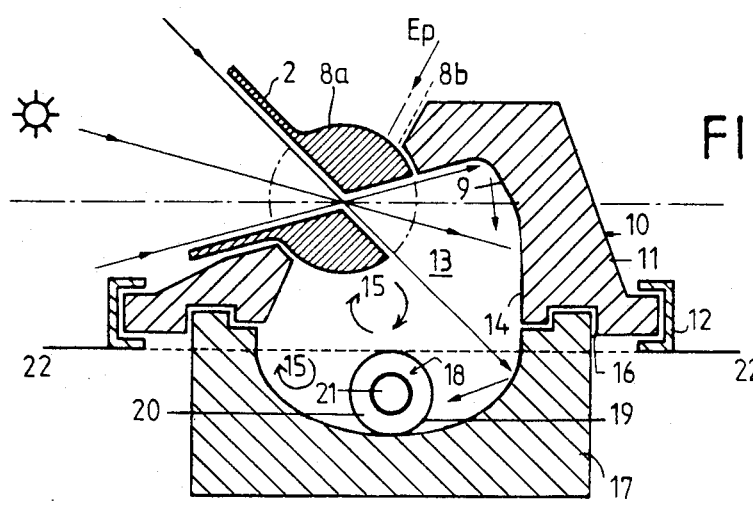
FIG. 13 is a schematic sectional view of one embodiment of a thermal focus for carrying out the invention, in case of an altazimuthal mount.

An experiment within the skill of the artisan permits selection between the angle of 40° adopted in the just examined figures or the angle of 30° which has been selected for FIGS. 11 to 13. The internal reflective surfaces then approximate the conical shape which is unquestionably of a simpler construction. When those surfaces of rectilinear generatrices are numerous, the concentrator can be designated as multiconical.

The maintaining of such surfaces in their relative positions requires materialization of several diametral planes on which they are secured and which are themselves connected to the supporting mount.

Figure 9:
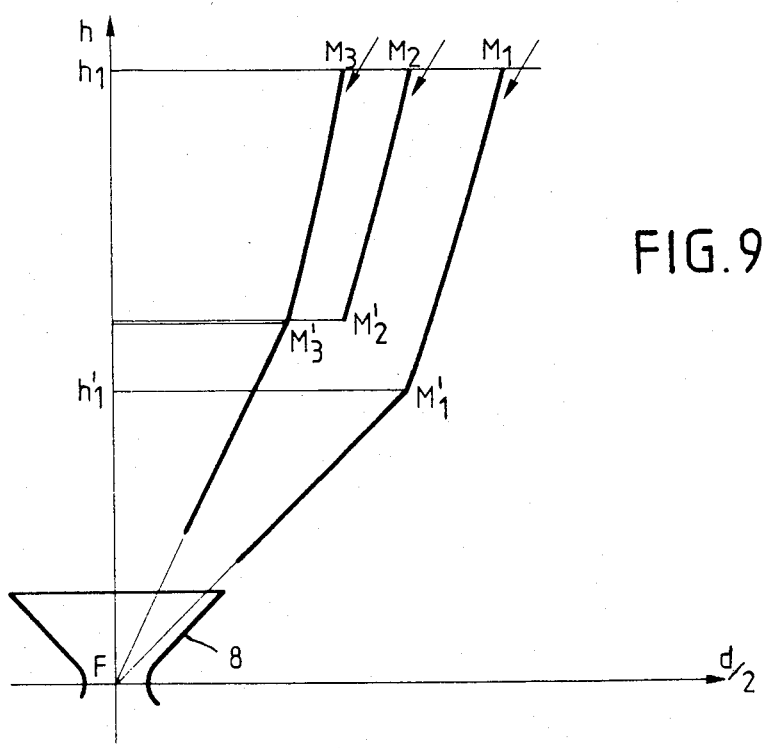
FIGS. 9 to 11 are views illustrating generatrices of the reflective surfaces forming the "super-concentrator" associated with the optical means according to the invention.
Figure 10:
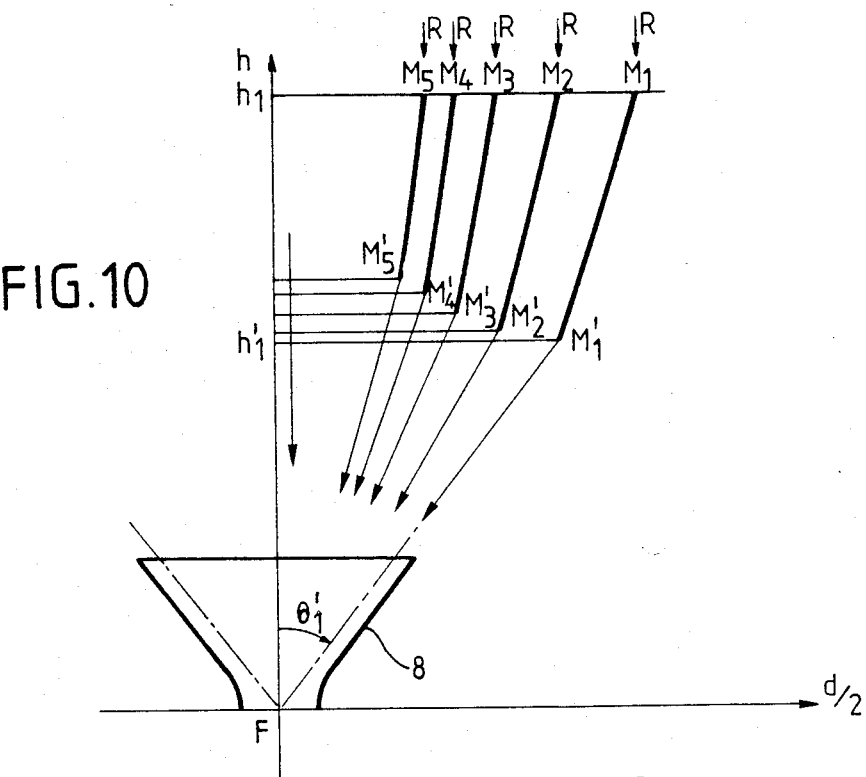

In the case when the required temperatures do not necessitate the closing of the prefocus, the paraboloid surfaces of revolution can be indented, i.e. present a circular cross-section less than 360°. This is necessary for permitting if need be the avoidance of certain obstacles in the orientation motion. The light radiations which pass through the indentation can be taken back in the neighborhood of the focal point through optical devices of lesser height to permit them to avoid the same obstacles. When the indentation is of 180°, the surface is called semi-paraboloid In order not to exaggeratedly increase this focal opening, the smallness of which is one of the fundamental characteristics of this invention, the converging rays are received in a reflector which in principle is conical but may also have a parabolic generatrix and which returns to the opening the excessively aberrant radiations. Such a reflector is called a "super-concentrator". It has been schematically shown in FIGS. 1 and 2 and is designated by reference numeral 8. FIGS. 9 to 11 give representations of conical or parabolo-conical generatrices of reflective surfaces forming such super-concentrator. It may be noted that the reflective paraboloids can be extended by conical reflective surfaces (refer to FIG. 11) which do not disturb the reflective flux and complete the role of the super-concentrator.

Figure 20:
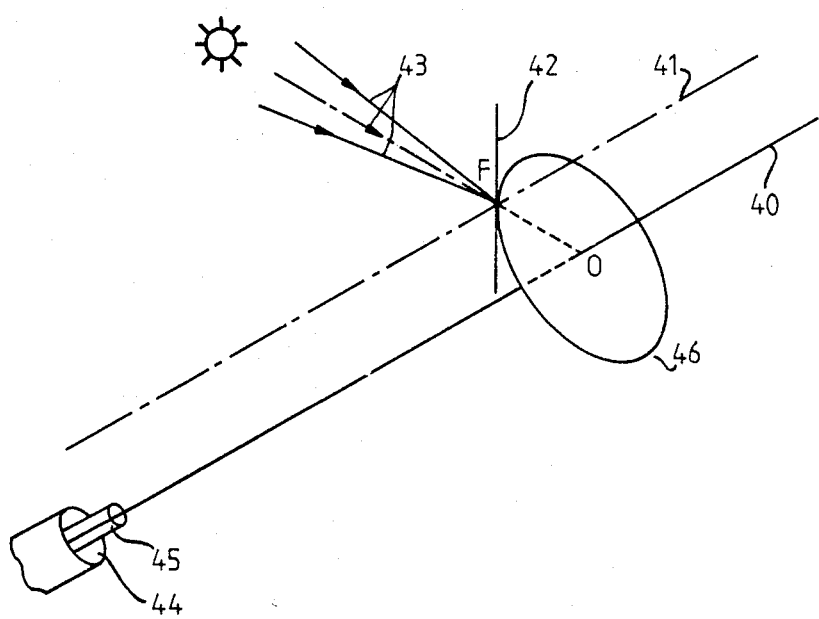
FIG. 20 is the geometric illustration of the case of an equatorial mount.

Whereas the super-concentrator is exclusively catoptric, the concentrator itself may be catoptric or dioptric and also a combination of both of these systems. As a matter of fact, it may be advantageous to replace the most internal reflective surfaces with a Fresnel lens, even if such lens has slightly higher losses since it concerns only low enough portions of the incident radiation. The concentrator is then called catadioptric. The mount must be such that the rotational axes are not materialized in the region where the radiations might circulate. The altazimuthal mount and the equatorial mount may respond to such criterion. As a matter of fact, the altazimuthal mount is designed for being laid down on the horizontal ground; it also comprises a vertical axis (which is the axis of the azimuths) which leads to a horizontal axis (which is the axis of the heights). The focal point must be the concurrent point of the axes. It is indeed in this position of the focal point that the divergent beam at the outlet of the focal opening sweeps in its motion the minimum space on following the sun. This permits design of a less voluminous thermal focus, therefore having minimum loss surfaces but still achieving the desired purpose of the invention. As regards the equatorial mount (refer to FIG. 20) which comprises an axis parallel to the axis of the world (horary axis) and a perpendicular axis (declination axis), the same observation applies for the focal point. However, in this case it is possible to avoid making the axes concurrent, the focal point being placed on the second axis or declination axis. The fixed portion of the thermal focus is then almost reduced to the pipes of heat transfer fluid.

Referring again to FIG. 20, reference 40 designates the virtual horary axis, 41 the actual horary axis, 42 the actual declination axis, 43 the convergent radiation beam, 44 the cross-section of the cylindric air (or gas) pipe, 45 the tube for circulation of the heat transfer fluid and 46 the maximum cross-section of the thermal focus. The horary axis can be materialized, e.g. through a rotary cylinder of cross-section 46 in suitably located bearings. Such an internally thermally insulated cylinder comprises on its outer surface in each focal point the declination axes which support the concentrators and about which the latter rotate. This cylinder constitutes the junction element referred to above; the fixed element is then formed only by the ends that must provide for the tightness of the thermal focus.

It is also to be noted that the insolator which is the container for the reception, absorption, and conversion elements and the like, must in principle have a transparent covering inclined to the latitude of the location, facing South. This is the inclination corresponding the minimum losses from reflections. This inclination, called the "insolator setting", may deviate somewhat from the latitude, thereby not resulting in large variations in the optical losses, especially if there is used for the transparent covering an anti-reflective surface which has moreover the advantage of avoiding the external "blinking" that may be caused by certain positions of the sun. The distribution of the concentrators in the insolator can be made in two ways:

1. By placing all altazimuthal mounts in the same manner with respect to the transparent covering and spacing them out stepwise along the meridian; and 2. By inclining the altazimuthal mounts by the selected setting angle and placing them always in the same manner relative to the transparent covering.

The vertical axis then becomes the perpendicular axis with respect to the inclined plane. The rotation of the axes no longer reproduce the azimuths and the height of the place of installation, but rather the azimuth and the height of the sun at the point of the terrestrial globe where the chosen inclined plane becomes the horizontal plane. The control of the motion is different but this belongs to the domain of the conventional regulation problems. As to the equatorial mount, the distribution is made by placing all the mounts in parallel in the same manner relative to the transparent covering.

The kinematic devices to be provided for driving the axes are devices known to the artisan.

For receiving at a given surface the maximum direct radiation, the concentrators must be placed so as to be as close to one another as possible, but however at a sufficient distance apart so that they do not meet any obstacles during their orientation motion. On the other hand, the positions depend on those of the fluid pipes, the design of which depends on various thermal considerations. Two paths can be provided, i.e. an alignment on the meridian, and an alignment according to the East-West axis. In certain cases, in particular for equatorial regions, the transparent covering of the insolator can be formed by an assembly of transparent domes thereby reducing the volume of the intermediary space.

Figure 14:
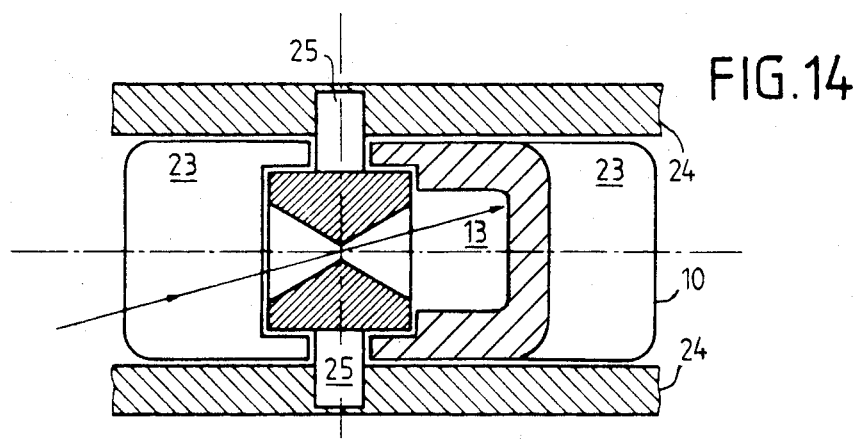
FIG. 14 is a planar view corresponding to FIG. 13.

The thermal focus considered as the enclosure comprising the heat transfer fluid pipe is necessarily fixed, this being a characteristic of the invention and the performances reckoned on lying essentially on such fixity. However, a movable element must provide the junction while preserving a suitable tightness between the movable prefocus which rotates about the axis of the heights (or the axis taking the place thereof) and the fixed focus. Such junction part necessarily rotates with the axis of azimuth (or the axis which also takes its place). Reference is now made to FIGS. 12 to 14 where:

2 designates the wall of the prefocus;

8, the super-concentrator on the radiation inlet side of the prefocus;

$R_t$ represents the radiation outlet within the thermal focus;

V designates the space reserved for the location of the thermal focus, and the junction element;

8$a$, the inlet cylinder rotating about the horizontal axis;

$E_p$, the vertical end position of the prefocus;

8$b$, the sealing provided by various known means;

9, the refractory (white) wall of the junction element of the thermal focus;

10, a junction part forming the upper portion of the thermal focus;

11, the thermal insulation;

12, a guide of motion about the vertical axis;

13, the actual chamber of the thermal focus;

14, the refractory walls;

15, the circulating air;

16, the sealing provided by various known means;

17, the fixed portion of the thermal focus;

18, the circulating air pipe;

19, an insulation which only exists outside the chamber of the thermal focus;

20, circulation of air in pipe 18;

21, the tube of the heat transfer fluid, necessarily fixed;

22, the upper face of the support or seating plane;

23, the bearings carried by the junction part 10; and

24, support arms of the concentrator fixed to the pin 25.

Realization of this structure does not present any particular difficulties. Tightness (i.e., sealing) can always be provided if necessary by means of a supple, if need be, pleated wall.

The pipe circulating the air which was heated in the thermal focus and in which possibly heat transfer fluid circulation tube(s) pass can be disposed in two ways:

either in parallel to the meridian line which corresponds to the more logical circulation, since it permits either the heated fluid to be degassed or possibly the produced vapor to be discharged, or in parallel to the East-West line. For facilitating if need be in this case discharge of vapor, a slight inclination, either East-West or reversed may be contemplated, the energy supplied by the lowest positions of the sun on the horizon generally not being significant. Such inclination has moreover the advantage (especially in case of insolators placed in the equatorial region) of facilitating the drainage of rainwater. The advantage of this arrangement is to permit the use of relatively long pipes which consequently collect more energy. As a matter of fact, if the meridian line were lengthened in order to obtain the same energetic result, the height of the North side framework would be prohibitive.

Since air plays a very significant role in the system it is suitable to supply, apart from the circulation blowers, filters for purification of air.

Figure 3:
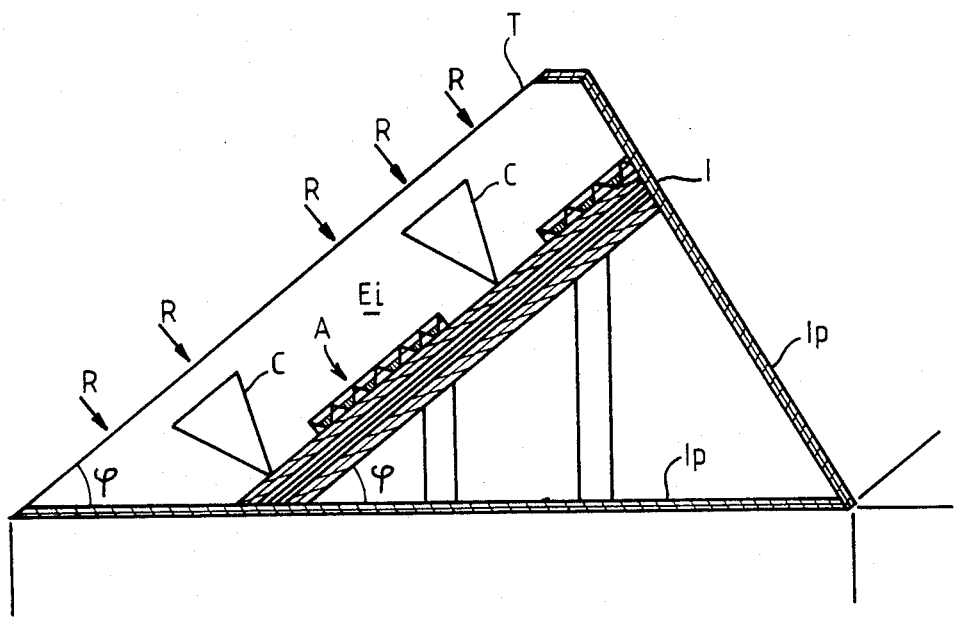
FIG. 3 is a schematic side view of an insolator for carrying out the invention.
Figure 4:
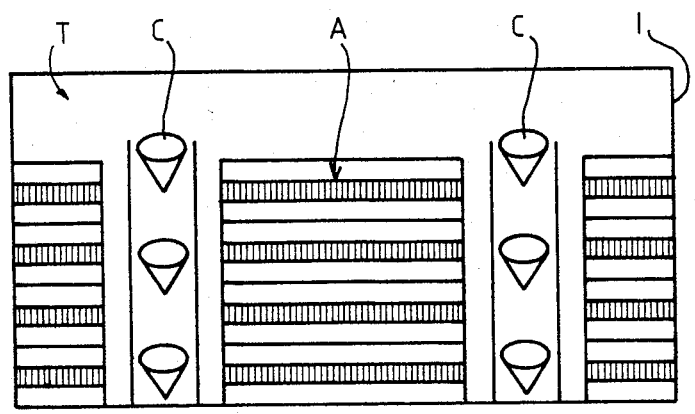
FIG. 4 is a schematic front view of such an insolator.
Figure 15:
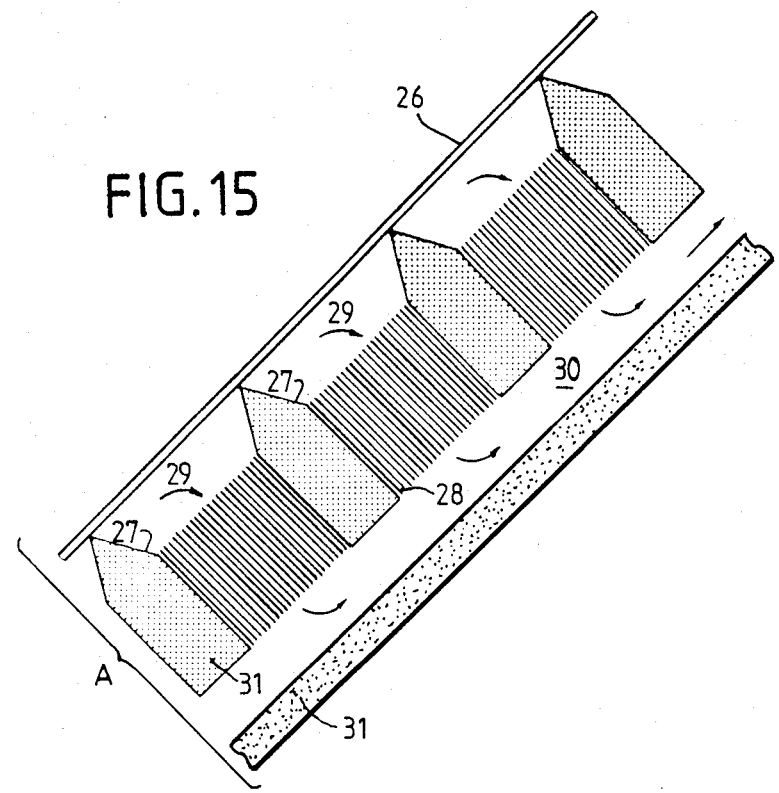
FIGS. 15 to 17 are schematic views illustrating absorbent surfaces used for realizing an insolator for carrying out the invention without a concentrator.
Figure 16:
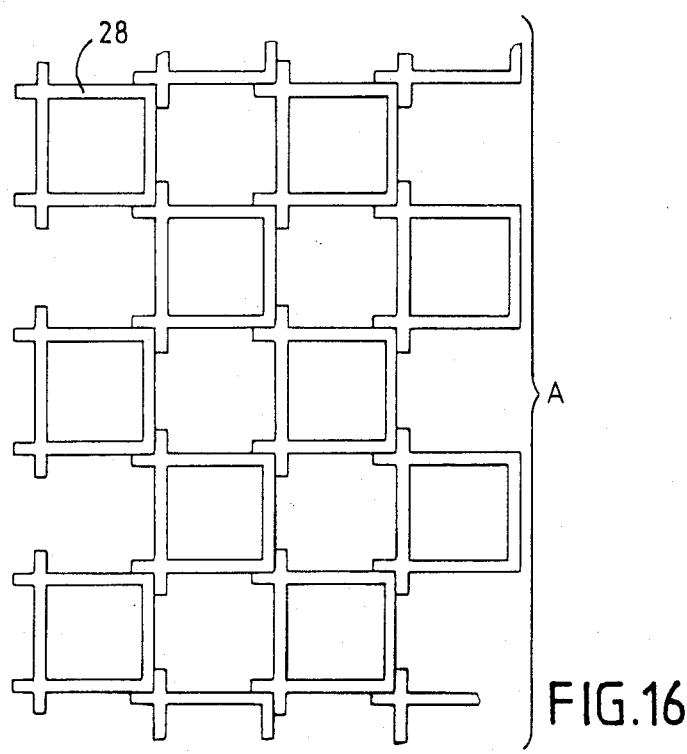
Figure 17:
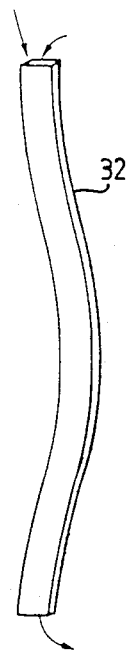

Reference will now be made to FIGS. 3 and 4 which illustrate an insolator, comprising concentrators according to the invention, in order to explain the operation thereof. Concentrators such as described above have been schematized and designated therein by the general reference C. The particularity of such an insolator I (with its transparent covering T and its insulating and absorbing walls $I_p$) is that it comprises a very large intermediate space $E_1$ where the prefocuses C are distributed as close as possible to one another in such a way that the reception of the direct radiation R is as high as possible, measures being however taken for preventing the orientation motions of such prefocuses, which moreover only move in parallel to one another from being hampered. The volume which receives the radiation not picked up by the concentrators is called the secondary focus. Conversion of the radiation into heat occurs as in any thermal insolator on the various surfaces which receive the radiation and which must be treated so as to be absorbent and if possible not transmissive in the infrared. However, in the case of this invention it is advantageous to carry such heat by means of air or any other gas circulated in this secondary focus and admitted by any suitable means (not shown); such air or gas may indeed be heated to a higher temperature than that usually present in conventional insolators due to a specific mode of reception of the solar radiation and of conversion into heat. Such air or gas which furthermore heats up little due to contact thereof with the various walls situated in the secondary focus, i.e. external surfaces of the prefocus, of the mounts, of the main focus, of the pipes, and the like, is in fact introduced through aspiration into an alveolar structure A (refer to FIGS. 15 to 17) where 26 designates a transparent covering; 27, internal reinforcing means with planar mirrors; 28, absorbent and anti-emissive alveolae for transfer of heat to the circulating air; 29, the air inlet of the secondary focus of the insolator; 30, the shaft for supplying air or a hot gas, the outlet from said shaft increasing in the direction of circulation of the air; 31, the thermal insulation. The slightly curved channels 32 (refer to FIG. 17) receive the overall solar radiation which passes through the transparent covering of the insolator and is partly reflected from the planar reinforcing means according to Herteman-Touchais's French patent application Ser. No. 75 07949 of Mar. 7, 1975.

The walls of such channels are absorbent in the entire range of the solar spectrum (visible and invisible); therefore they heat up and transfer the heat to the air or gas circulating along the walls, such circulation being rendered turbulent by means of various bumps formed on said walls which are made of a very thin and very insulating material, i.e. refractory glass, "Bakelite", and the like. Such alveolae work from the point of view of emission of infrared radiation, save for the distribution of the temperatures along the wals, a little like Francia's cellular structures. The circulation of the gaseous fluid occurs in the direction of propagation of the light and there are practically no losses through convection, and the losses by infrared emission are low. The performance of this type of insolator, which may be manufactured relatively simply, is excellent so that the achievement of so-called "average temperatures" can be contemplated. The above-mentioned bumps may be merely constituted by lugs cut out from the very walls of the channels, thereby permitting realization of short circuits which are used by the air streaks for more equal distribution thereof into the various channels.

The same alveola system can be used in the concentrator either at the outlet of the prefocus in the focal opening or in the thermal focus or simultaneously at the outlet of the prefocus and in the thermal focus. The losses through the focal opening are then significantly reduced.

The final purpose of the invention being the realization of industrial solar energy production, it is important to obtain sufficiently high temperatures to permit thermodynamic conversion and thus production of electric energy under the best possible economical conditions. It is therefore suitable to examine more accurately the case of production of high pressure and high temperature steam.

The insolator with the concentrators can be considered as being formed of juxtaposed meridian slices or East-West slices supplying vapor of the required characteristics, air or hot gas at a high temperature, finally air or a hot gas or liquid at average and low temperatures. The assembly of the juxtaposed slices constitute a thermal unit or steam boiler the dimensions of which can be determined only by economical considerations.

Figure 18:
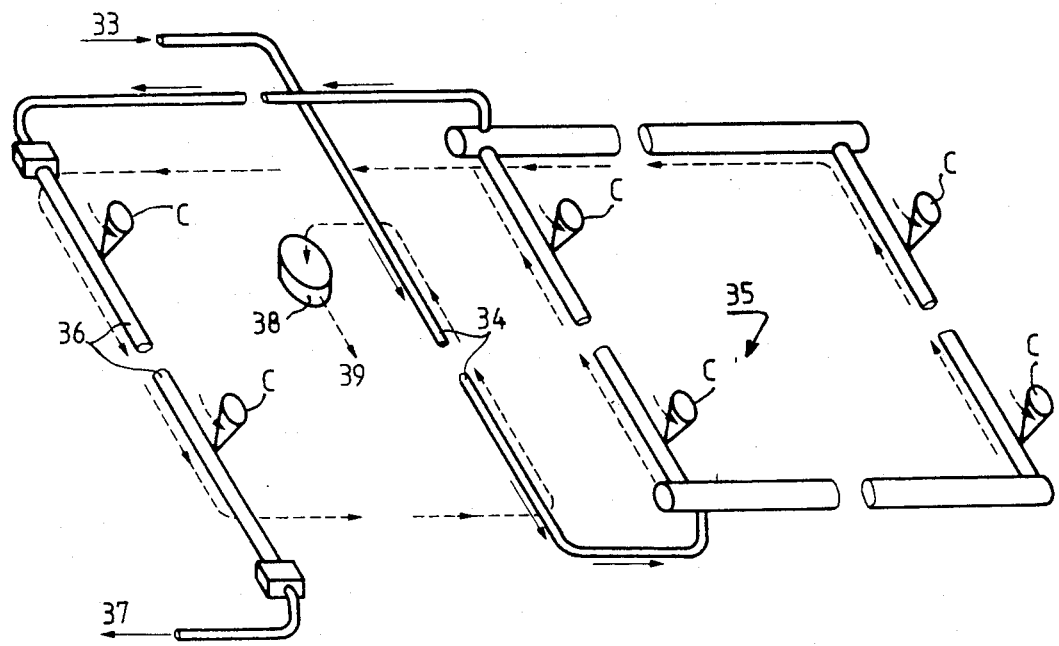
FIGS. 18 and 19 are schematic views to illustrate the application of the invention for realizing thermal installations.
Figure 19:
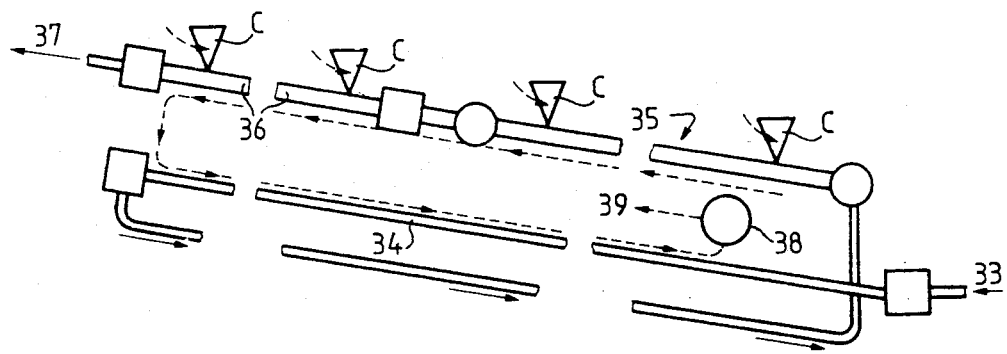

The feed water to such boilers must be preheated; the thermal unit must therefore comprise in the free space provided within the insolator the equivalent of an economizer, the tubes of which being traveled by the feed water are heated by the air or hot gas carrying a portion of the main thermal flux which is the equivalent of smoke in combustion type boilers. If there are other thermal fluxes they may be used to supply industries which can be installed on the ground under the insolator. FIGS. 18 and 19 illustrate several possible diagrams of installations. Thus, FIG. 18 is a schematic view illustrating the case of the concentrators C aligned according to the meridian inclined by the latitude whereas FIG. 19 illustrates the case of concentrators C aligned in the East-West direction with a slight slope. In the drawings:

33 designates the input of feed water;
34, an economizer;
35, the vaporiation circuits;
36, the over-heating circuits;
37, the high pressure and high temperature steam outlet;
38, a blower; and
39, return of air into the insolator.

A thermal station that can be contemplated according to the invention comprises moreover all accessories of the devices required for supplying vapor to the thermal power station which must in particular supply electric energy, i.e. heat transport collectors, separating balloons, automatic purgers, safety valves, various pipings for feed, discharge, extraction, apparatus for production of back up-water and treatment of such water, pumps, blowers and the like, all this being within the domain of the artisan and not being specific to solar energy. As regards the installations, specific to solar energy, the random variability of the incident radiations requires that regulation devices be provided to accommodate the produced energy so as to meet the consumption.

Furthermore, it is suitable to recover all the energy losses generally at a low temperature but which can be upgraded in temperature precisely by means of the air insolators which are the object of this invention. This upgrading can be effected either at a medium temperature by means of the air insolator of high performance described hereinabove or at a higher temperature precisely by means of concentrators. The required exchangers can be housed in the intermediate space so as to reduce thermal losses. The heat which can be upgraded immediately may be stored temporarily, generally in perceptible form, in expectation of favorable sunshine. The storage containers are naturally placed under the insolator.

Although the regulation can be realized as is usual at present by heat accumulation, the possibility of recovering the thermal losses however opens up the way to multiple applications in which a thermal source is necessary.

The applications of the invention therefore include all applications of fluid heating.

It is to be noted that all the above is applicable to the case when the reflective surface instead of being a paraboloid of revolution is cylindro-parabolic, the cross-sectional figures being exactly applicable to either case.

The multiple cylindro-parabolic concentrator has the advantage of a higher energy pick up for the same width of the first window; it may have the disadvantage of a higher loss through infrared radiation passing through the second window, the surface of which is a little higher, still for the same width of the first window, but such losses are recovered by the prefocus which constitutes a fundamental characteristic of this invention.

In particular, the following points can be specified:

The transparent covering is in principle stationary, but, however, if it is desired to avoid the shadow of the frame supporting the transparent plate carried onto the concentrator the covering may be rendered movable. The transparent plate is generally rectangular; the movement may then be reduced to a simple translation according to the smaller axis of the rectangle.

The transparent covering is generally planar but it may have a cylindric shape, i.e. a cylinder with or without a vertical axis and more generally an absolutely optional shape.

In case all the concentrators cannot receive the direct radiation simultaneously, they can receive them through reflection from outer heliostats. The utilization of such heliostats may even be contemplated in the case of the planar covering which is then selected preferably as vertical.

The inlet window of incident radiation for the concentrator is not necessarily a planar surface of a circular shape. In particular if it is:

(a) a Fresnel lens, this window may have any shape, in particular a polygonal one; it may be planar or constitute a kind of dome on the prefocus; or (b) a multiparaboloid, this window can be a portion of a sphere to prevent diameter extension of the image spot on the focal plane.

The section of the optical system through a plane perpendicular to the optical axis may be absolutely optional. In the case of the reflective surface, this may be formed of narrow elements of paraboloid of revolution having the same optical axis and the same focal point, disposed close to one another to be able to pick up more radiation than the usual circular shape permits.

Such a section can be polygonal and more particularly hexagonal. More generally, such surface the sections of which through the planes perpendicular to the optical axis, are a priori indifferent can be formed to a certain extent of parabolic generatrices with or without the same focal point on the same axis or a parallel axis. The focal points corresponding to each generatrix can actually be distributed in any manner on the radiation inlet plane within the thermal focus. Such distribution of the focal points can be selected in particular so as to homogenize the illumination over the inlet plane or the receiving surfaces located within the thermal focus itself.

In the first case, the device is particularly interesting for reinforcing the energetic illumination of photovoltaic cells. In the second case, it is possible to more easily homogenize the temperatures within the thermal focus.

The cross-section of the radiation inlet window in the thermal focus does not constitute a primary factor since the near suppression of losses through such opening due to aspiration of the air, which recovers, on its passage in the prefocus, the major portion of the re-emitted energy which is transformed into heat precisely in the focus, makes the small size conditions less significant in the window.

The rearward portion of the insolator forming the thermal insulation can be locally transparent to illuminate if need be the ground or the premises located underneath. Such rearward portion, always thermally insulated, can be formed of parallel transparent blades confining air streams or else alveolar structures of the Francia type with honeycombs, of transparent plastics material or of supple plastics film pleated and depending naturally.

The light which thus crosses the pick-up assembly either directly or by means of light guides may also be used for agronomic applications.

There can be disposed in the intermediate space between the transparent covering and the rearward background, apart from the already mentioned photothermal converters, photoelectric or photochemical converters in the most favorable locations. The photoelectric cells being generally thin, their installation is therefore facilitated. The electric energy thus obtained directly can provide energetic autonomy for the installation or at least for the monitoring and safety devices.

It will be understood that this invention is only described and represented in a purely explanatory and not at all limitative manner and that any useful modification can be brought thereto without departing from its scope.

We claim:

1. A method of collecting and maximally utilizing solar radiation, which comprises, in an intermediate space between a transparent covering and an absorbent receiving surface of an insolator, receiving collimated radiation coming from the sun through an optical means which is thermally insulated and orientatable so as to track said radiation, converging such radiation to a focal point, collecting through an opening having as small a diameter as possible the beam of radiation emanating from said focal point, and making it penetrate into a positionally fixed, thermally insulated enclosure, using the latter as a thermal focus containing fixed thermal exchange surfaces, bringing such enclosure to a negative pressure thereby to cause air or another gas to flow thereinto, receiving the solar radiation not previously absorbed by thermal absorbent receiving surfaces while also circulating air or another gas in said intermediate space, and outputting the total incident energy transferred both to said thermal focus and to said air or the gas circulating in the assembly of said insulator.

2. A method according to claim 1, comprising disposing said opening of small diameter substantially at right angles to said focal point.

3. A method according to claim 1, comprising placing the concurrent point of the actual or virtual rotational axes serving for the orientation motions of said optical means substantially at said focal point.

4. A device for collecting and maximally utilizing solar radiation comprising, in an intermediate space formed between a transparent covering and absorbent receiving surfaces of an insolator, an optical means which is thermally insulated and orientatable to track collimated radiation coming from the sun, said optical means selected from the optical devices of the catoptric and dioptric type permitting propagation of a beam of reflected radiations in the general direction of incident light, a positionally fixed thermally insulated enclosure having negative pressures therein for causing air other gas to flow thereinto receiving the incident light, said insolator located in said insulated enclosure, a thermal focus in said intermediate space being a focal point of the optical path of the radiation with said intermediate space having an opening of small diameter.

5. A device according to claim 4, wherein the optical means comprises a Fresnel lens or reflective surfaces or a combination thereof, the reflective factor of which is especially hight in the visible range and low in the infrared spectrum in association with a transparent covering located at the solar radiation inlet; said Fresnel lens constituting such covering.

6. A device according to claim 4, wherein the optical means consists of a wide-angled multiparaboloid of revolution or a reflective surface formed of several wide-angled paraboloids of revolution located inside one another, such paraboloids being indentable over an angle that reaches 180°.

7. A device according to claim 4, wherein the optical means consists of wide-angled multisurface cylindroparabolic elements.

8. A device according to claim 4, wherein the thermally insulated enclosure designed fon serving as the thermal focus is traversed by fixed pipes for circulation of a heat transfer fluid.

9. A device according to claim 4, wherein said thermal focus is stationary with respect to said optical means except for the portions that form the junction between the fixed and movable portions.

10. A device according to claim 4, comprising supplementary optical means called "super-concentrators" which are located in the neighborhood of the opening situated at said focal point such as to embrace all of the convergent but possibly aberrant radiations to direct them efficiently towards the focal opening so that they can penetrate into said thermal focus.

11. A device according to claim 4, comprising supplementary alveolar absorbent receiving surfaces provided either at the outlet from said optical means in the focal opening or in said thermal focus or at either location so as to reduce the losses by re-mission through the focal opening.

12. A device according to claim 4, comprising, apart from the optical focusing means, receiving surfaces consisting of tubular alveolae very absorbent in the visible and infrared ranges to form channels traveled in the direction of the radiation by circulating air having a turbulent motion.

13. A device according to claim 4, comprising safety shieling means disposed in the optical path of the radiation.

14. A device according to claim 4, wherein the transparent covering of the insolator assembly with concentrators may have a translational motion.

15. A device according to claim 14, wherein the transparent covering may be planar or of different shapes and in that outer heliostats are provided when the concentrators of the entire installation do not simultaneously receive the direct radiations.

16. A dèvice according to claim 15, wherein an inlet window of incident radiation to the optical focusing means may be of a shape and cross-section, as may be the section of the optical means through a plane perpendicular to the optical axis.

17. A device according to claim 4, wherein the rear portion of the insolator which forms thermal insulation can be locally transparent to illuminate if need be the ground or the premises disposed underneath.

18. A device according to claim 4, comprising converters other than photothermal converters including photoelectric converters disposed at any available place so as to best use the incident energy.

19. A device according to claim 4 for the realization of solar energy cells wherein in the intermediary space included between the transparent covering and the absorbent surfaces one or more of said optical means or concentrators is disposed in one or more lines in both directions in space along East-West or North-South lines.

* * * * *